United States Patent Office 3,097,231
Patented July 9, 1963

3,097,231
MANUFACTURE OF DIBASIC ACIDS AND ESTERS THEREOF FROM PETROLEUM FRACTIONS
Ivor W. Mills, Glenolden, and John J. Melchiore, Ridley Park, Pa., assignors to Sun Oil Company, Philadelphia, Pa., a corporation of New Jersey
No Drawing. Filed June 10, 1959, Ser. No. 819,216
8 Claims. (Cl. 260—475)

This invention relates to a method of manufacturing acidic materials from petroleum fractions containing naphthalenes and to the novel acidic products and esters thereof. The invention particularly relates to the preparation of substituted dihydronaphthalene dicarboxylic acids from cracked gas oil and to esters derived therefrom which are suitable for use as plasticizers for vinyl polymers.

It is known that polycyclic aromatic compounds, such as naphthalene and its homologues, for example the alkylnaphthalenes, can be converted to dicarboxylic acids by reaction with an alkalimetal, e.g. sodium, in certain ether media, followed by treatment with carbon dioxide to form the alkali metal salt of the dibasic acid and acidification with a mineral acid to yield free dibasic acids. The recovered acids are a mixture of dihydronaphthalene 1,2-dicarboxylic acids, dihydronaphthalene 1,4-dicarboxylic acid, both of which are white, crystalline materials, and other acids of undetermined composition which are liquids. The esterification of all of these acids, with an alcohol having 1 to 8 carbon atoms, such as n-amyl alcohol, yields esters which are valuable as plasticizers for vinyl polymers.

Vinyl polymers can be utilized for many applications in industry due to their wide range of properties. The polymers as formed, however, do not have completely desirable properties for use in such applications as coating compositions, fibers, films, shaped articles and the like. To aid in improving the quality and usefulness of vinyl polymers, another compound known as a plasticizer is added to the vinyl polymer. This plasticizer should be compatible with the polymer in an amount sufficient to impart the desirable properties to the polymer and should not adversely affect the color, inflammability, and the odor of the finished product.

The present invention is based on the discovery that hydrotreating a gas oil charge stock containing naphthalenes to remove undesirable contaminants, such as sulfur compounds, prior to the addition of sodium or other alkali metal to the petroleum fraction will effect an increased yield of acidic materials and will improve color and odor of the esters produced therefrom for use as plasticizers of vinyl polymer.

To obtain esters of desirable quality from disbasic acids, the conventional practice has been to use, as a charge stock, a relatively pure hydrocarbon, that is, naphthalene and its homologues, which is relatively free from contaminants, such as sulfur. It is known, however, that useful dibasic acids can be obtained from a cracked petroleum fraction such as a gas oil. Cracked gas oil, sometimes referred to as recycle stock, is a product boiling in the gas oil range obtained in thermal or catalytic cracking operations.

The charge stock used in the present invention is obtained as a cracked gas oil fraction boiling in the range of 400° F. to 550° F. which contains naphthalene constituents. Within this definition of starting material are included cracked gas oils as obtained directly from distillation of cracking products, such gas oils having an initial boiling point not substantially lower than 400° F. and a final boiling point not substantially higher than 550° F.; and mixed aromatic concentrates obtained from such cracked gas oils and having a boiling range substantially the same as the starting cracked gas oil. The mixed aromatic concentrates can be obtained by means known to the art; for example, adsorption on silica gel, furfural extraction, etc.

According to the present invention, the cracked petroleum fraction should have a hydrocarbon composition containing substantial amounts of dicyclic aromatic compounds and preferably little if any tricyclic aromatic compounds. Since the petroleum fraction can be derived from practically any source of crude petroleum, its specific composition can vary considerably. The metallation reaction will take place primarily between the sodium and alkylnaphthalenes contained in the charge material and reaction between sodium and any monocyclic aromatic compounds will be negligible. Even though the boiling range of the petroleum fraction can be between 400° F. and 550° F., it is preferred that the boiling range be substantially between 450° F. and 500° F. so that a concentrate of such dicyclic compounds as dimethyl naphthalene can be obtained.

The hydrotreating of the petroleum fraction according to the invention should be carried out under conditions such that no substantial change in the hydrocarbon composition will occur. In other words, the hydrotreating conditions should be such that no tetralin, for example, will be formed from any naphthalene present in the petroleum fraction. It is desirous only to remove the objectionable sulfur compounds from the petroleum fraction and not to obtain substantial hydrogenation of the aromatic rings. Hence, the hydrotreating conditions are severe enough to remove sulfur compounds but not so severe as to cause hydrocracking and/or hydrogenation of the hydrocarbons. A convenient measure of satisfactory hydrotreating is that the refractive idex of the product should be within 0.01 of the starting material.

The method of hydrotreating can be accomplished by any of the means known to the art. Usually a hydrotreating catalyst is employed, such as cobalt molybdate or molybdenum disulfide deposited on alumina. The temperature required will be in the range of 800° F. to 1050° F. with the preferred temperature being 950° F. Other hydrotreating conditions are: pressure range between 350 and 2000 p.s.i.g., the preferred pressure being about 500 p.s.i.g.; molar ratio of hydrogen to oil between 5:1 and 20:1 with the preferred hydrogen to oil ratio being about 10:1; and liquid hourly space velocity between 0.5 and 10 volumes oil per volume of catalyst per hour with the preferred space velocity being about 2.0 v./v./hr.

In contacting the petroleum fraction with hydrogen it is preferred to pass the hydrocarbon in an atmosphere of hydrogen through a bed or tower containing sufficient hydrotreating catalyst for the desired space velocity. Other methods of hydrotreating known to the art are equally satisfactory for the practice of this invention.

Following the hydrotreating step the hydrotreated material is reacted with an alkali metal to form alkali metal naphthalene compounds. For convenience the alkali metal is referred to herein as sodium, although other alkali metals such as lithium and potassium can be used if desired. The metallation reaction between the sodium and the alkyl naphthalenes contained in the hydrotreated petroleum fraction is carried out in a reaction medium consisting of an ether of a particular class of ethers that appear to possess the property of promoting or aiding in the formation of the sodium-hydrocarbon complex. These so called "special ethers" are described in United States Patent Number 2,054,303. Examples of ethers that can be used satisfactorily are dimethoxy ethane and dimethyl ether. The ethers used in conjunction with the metallation reaction should not contain any groups such as hydroxyl or carboxyl which are distinctly reactive toward sodium. Although the ether may react in some manner not completely understood, it must not be subject to any action that destroys the ether or uses up sodium or tends to induce polymerization rather than the desired reaction. The concentration of ether in the reaction mixture should at all times be maintained at a sufficient level to have a substantial effect upon the desired metallation reaction. The reaction temperature for the metallation reaction is preferably held below 0° C. with the temperature range between −20° C. to −50° C. being particularly preferred.

The carbonation of the sodium hydrocarbon complex can be carried out by contacting the sodium compound with a carbonating medium such as Dry Ice, gaseous carbon dioxide, or other carbon dioxide releasing agents. In instances wherein the nature of the metallo compound to be carbonated requires that it be carbonated at a relatively low temperature, carbonation suitably can be carried out by use of Dry Ice, such as by pouring the metallo compounds onto an excess of crushed Dry Ice. Another method of effecting carbonation is to pass carbon dioxide vapor over the metallo compound until the liquid mixture is saturated with carbon dioxide. The temperature involved in carbonation at atmospheric pressure is normally below −60° C., and on some occasions, as low as −80° C., but higher temperatures can be used by applying the carbon dioxide at elevated pressures. Other means of carbonation known to the art can be used.

The product obtained by acidifying the carbonation product of the sodium compound prepared as above described is a mixture of white, crystalline acids, yellow, liquid acids, and resinous materials. The specific chemical composition of the product obtained cannot be stated definitely in view of the wide variation in charge stock composition that can occur. However, the crystals and the liquid are predominantly 1,4-type acids which are essentially water insoluble and 1,2-type acids which are essentially water soluble. The remaining resinous material is believed to be a cis-trans-modification of the other acids and has the consistency of molten glass.

The recovered acidic materials, both liquid and solid, can be esterified with an alcohol having 1 to 8 carbon atoms which can be an alkyl or cycloalkyl alcohol, or a corresponding olefinic alcohol or a phenol. The method of esterification can be by any known method; for example, the esterification can be accomplished by refluxing the alcohol and the mixture of acidic materials in the presence of a solvent and a catalyst if desired. The desired product can be separated from the esterification reaction mixture, for example, by vacuum distillation. This recovered fraction thus comprises a wide boiling range mixture of esters. Alcohols which can be used in the esterification include methyl, ethyl, propyl, butyl, amyl, hexyl, heptyl and octyl alcohols with either straight chains or branched chains. Other examples include cyclopentanol, cyclohexanol, dimethylcyclohexanols, phenol, cresols, xylenols, phenyl methanol and the like.

Esterification of the acidic materials, performed as described above, has been found to give remarkably high yields of materials suitable for plasticizing vinyl polymers. Although the acidic materials used in the esterification are most likely highly complex, they are apparently free from materials which would substantially interfere in the esterification or in plasticizing the vinyl polymers. Thus, the wide boiling range mixtures of esters obtained, as hereinabove described, have been found to be highly satisfactory as plasticizers for vinyl polymers.

The boiling range of the mixed esters produced by esterification of the dihydronaphthalene dicarboxylic acids will generally be in the range of 150° C. to 260° C. at 0.15 mm. Hg. The particular boiling range will be dependent upon the type of alcohol used for the esterification. For example, it is preferred to esterify the aromatic acids with normal amyl alcohol; consequently, the diamyl ester has a boiling range from about 170° C. to 225° C. If, on the other hand, methyl alcohol had been used the initial boiling point would be as low as 150° C. while, if octyl alcohol had been used the final boiling point would be as high as 260° C.

The esters contemplated by the present invention can be used as vinyl polymer plasticizers either alone or in conjunction with known plasticizers such as dioctyl phthalate, dibutyl phthalate, tricresyl phosphate, and the like. The ester mixture can be incorporated with the vinyl polymer in any suitable manner, for example, by milling, molding, dissolving together in solvents, etc.

The proportion of ester to polymer in the composition can be varied widely. However, in most cases, 20 to 150 parts by weight of ester per 100 parts polymer are suitable proportions. Preferred proportions are 40 to 75 parts by weight of ester per 100 parts of polymer.

The following examples illustrate the invention:

EXAMPLE 1

An aromatic concentrate from a catalytically cracked gas oil having a boiling range of 450 to 500° F. was obtained by passing the gas oil through a bed of silica gel and recovering the adsorbed aromatic constituents by the use of a desorbing agent according to the method known in the art. This aromatic fraction was hydrotreated under the following conditions:

Temperature=850° F.
Pressure=500 p.s.i.g.
LHSV=1–3
Hydrogen to oil=10–1
Catalyst=8–12% cobalt molybdate on alumina The charge and hydrogenated product contained the following:

|  | Charge | Product |
| --- | --- | --- |
| Dicyclic aromatics, weight percent | 58 | 53 |
| Sulfur, weight percent | 0.58 | 0.019 |

240 grams of the above-mentioned hydrotreated aromatic fraction from catalytic gas oil were contacted with metallic sodium at −73° C. using 1,2-dimethoxy ethane as solvent. 132 grams of mixed acids were recovered following carbonation with carbon dioxide and acidification with concentrated hydrochloric acid. 26 grams of sodium were consumed in the process. Of the 132 grams of acids produced, 80–90% were 1,4-type acids with the remaining 10–20% being of the 1,2-type acids. About 40% of the total acids were white, crystalline solids with the remainder being liquid or resinous materials. The 1,4-type acids were fractionated according to benzene solubility. 30–40% of the 1,4-type acids were white, crystalline, benzene-insoluble acids corresponding to substantially dimethyl naphthalene dicarboxylic acids with a melt point between 200° C. and 207° C. and an acid number of about 457. About 70% of the 1,2-type acids were white, crystalline, benzene-insoluble acids corresponding to mono- or dimethyl dihydronaphthalene dicarboxylic acids with a melt point between 185° C. and 190° C. and an acid number of about 467.

EXAMPLE 2

Another portion of the aromatic concentrate obtained as in Example 1 was reacted, without first being hydrotreated, under substantially identical conditions as the hydrotreated portion. However, only 20% of the total acids produced were white, crystalline alkyl dihydronaphthalene dicarboxylic acids (melt point=200° C. to 202° C., acid number=471). The remaining 80% are liquid acids consisting of mixtures of alkyl dihydronaphthalene mono- and di-carboxylic acids (acid number=310). In addition these liquid acids contain 0.57 wt. percent sulfur. These results, compared with those of Example 1 show that hydrotreating of the charge permits an increased yield of the desired crystalline dibasic acids to be obtained.

EXAMPLE 3

The white, crystalline solid acids obtained as described in Example 1 were converted to the diamyl ester by direct esterification with n-amyl alcohol at 140° C. using p-toluene sulfonic acid as the catalyst. The final ester mixture obtained in 80% yield was a clear pale yellow liquid having a faint, pleasant odor and distilling between 175 and 220° C. at 0.3 mm. Hg.

The liquid acids obtained in Example 1 were converted to amyl esters in a similar manner. Approximately 88% of the esters were yellow diamyl esters having a faint pleasant odor and boiling between 170° C. and 225° C. at 0.15 mm. Hg. The remaining 12% of the esters were mono amyl esters boiling between 100° C. and 170° C. at 0.5 mm. Hg.

EXAMPLE 4

The white, crystalline dibasic acids obtained from the unhydrotreated charge as in Example 2 were converted to the diamyl esters using n-amyl alcohols in the presence of p-toluene sulfonic catalyst at 138° C. The yield of this diester mixture was 70% as a clear yellow liquid having a faint, pleasant odor and boiling from 165° C. to 201° C. at 0.15 mm. Hg.

In a similar manner the amyl esters of the liquid acids obtained as in Example 2 were also prepared. A mixture of esters believed to be mono and diamyl esters resulted. The mono esters were yellow liquids having an extremely unpleasant odor and boiling from 70° C. to 140° C. at 0.1 mm. Hg. The diester mixture was orange colored, having an extremely unpleasant odor and boiling from 140° C. to 185° C. at 0.1 mm. Hg.

These results, compared with those in Example 3 show that the use of the hydrotreating step in accordance with the invention permits a higher conversion of the acids to esters to be obtained in the esterification step and also show that the quality of the esters obtained is distinctly better.

EXAMPLE 5

In this example, the amyl esters obtained from crystalline acids and from liquid acids as described in Examples 3 and 4, were used as plasticizers in polyvinyl chloride films. The following table illustrates the substantial improvement in plasticizer quality obtained from the hydrotreated charge stock when compared with the unhydrotreated charge stock.

other polymers of vinylidene monomers such as the homopolymers, copolymers, or interpolymers of vinyl monomers. Examples of polymers of vinylidene monomers include styrene, substituted styrenes, vinyl naphthalene, acrylic acids, acrylic acid esters such as methyl acrylate and methyl methacrylate, vinylidene halides, vinyl halides, acrylonitrile, vinyl acetate, vinyl benzoate, vinyl caproate, divinyl succinate, vinyl acrylate, vinyl ethyl ether, etc. Other vinylidene polymers can be plasticized by the esters of the present invention, such as the resins obtained as a result of reaction between polyvinyl alcohol and aldehydes. Polyvinyl formal, polyvinyl acetal, and polyvinyl butyral resins are illustrative of the latter group of resins. As used herein, the term "polymers of vinylidene monomers" specifically includes the art-recognized term "vinyl polymer."

The invention claimed is:

1. A method of preparing acidic materials from a petroleum fraction boiling mainly within the range 400° F. to 550° F. and selected from the group consisting of cracked gas oil and mixed aromatic hydrocarbons separated from cracked gas oil which comprises hydrotreating said fraction without substantial hydrogenation of hydrocarbons, contacting the hydrotreated fraction in an ether solution with an alkali metal to form alkali metal-naphthalene compounds, carbonating said compounds by treatment with carbon dioxide to form acid salts and treating such salts with a mineral acid to form the corresponding acids.

2. A method of preparing esters of an alkyl alcohol with acidic materials prepared from a petroleum fraction boiling mainly within the range 400° F. to 550° F. and selected from the group consisting of cracked gas oil and aromatic fractions separated from cracked gas oil which comprises hydrotreating said fraction without substantial hydrogenation of hydrocarbons, contacting the hydrotreated fraction in an ether solution with an alkali metal to form alkali metal naphthalene compounds, carbonating said compounds by treatment with carbon dioxide to form acid salts, treating such salts with a mineral acid to form the corresponding acids and esterifying the acids with an alcohol having 1 to 8 carbon atoms.

3. In a process for the manufacture of substituted dihydronaphthalene dicarboxylic acid, the steps which comprise hydrotreating, in the presence of a hydrotreating catalyst and at a temperature between 800° F. and 1050° F., a pressure between 350 p.s.i.g. and 2000 p.s.i.g., a molar ratio of hydrogen to oil of between 5:1 and 20:1 and a liquid space velocity of between 0.5 and 10.0, a petroleum fraction boiling mainly within the range 400°

*Evaluation of PVC Plasticizers Derived From Catalytic Gas Oil Extracts*

| Source of acids | Physical state of acids | Plasticizer sample | Ester boiling range (° C.) | Evaluation of plasticized PVC sheet [1] | | | |
|---|---|---|---|---|---|---|---|
| | | | | Volatility,[2] percent | Brittle point (° C.) | Heat stability | U.V. Stability [3] |
| Unhydrotreated cat. gas oil | Solid | Di amyl ester | 165–201 at 0.15 mm | 5.4 | −10 to −15 | 7 hrs. at 150° C | Very bad discoloration. |
| Hydrotreated cat. gas oil extract | Liquid | do | 170–225 at 0.15 mm | 2.82 | −15 to −20 | do | Intermediate discoloration. |
| Do | Solid | do | 175–220 at 0.3 mm | 2.86 | −15 to −20 | do | Slight discoloration. |

[1] Composition of sheet: 58.6 g. GEON 101 (PVC); 0.95 g. lead carbonate; 0.45 g. stearic acid; 40.00 g. plasticizer.
[2] Volatility test: Weight loss after 3 hours at 100° C.
[3] Ultraviolet stability test: Discoloration after 72 hours exposure to U.V. source.

The foregoing examples show that the use of the hydrotreating step in accordance with the invention results in higher yields of the desired dibasic acids and higher conversion of the acids to esters, and also that the resulting esters have improved color, odor and quality for plasticizing vinyl polymers. While the use of the esters has been specifically described for plasticizing polyvinyl chloride, they are also suitable for plasticizing F. to 550° F. and selected from the group consisting of cracked gas oil and mixed aromatic hydrocarbons separated from cracked gas oil, contacting the hydrotreated petroleum fraction with sodium metal in an ether solution to form sodium naphthalene compounds, carbonating the resulting reaction mixture with carbon dioxide to form sodium salts of said dicarboxylic acids and acidifying with a mineral acid.

4. In a process for the manufacture of esters of substituted dihydronaphthalene dicarboxylic acids, the steps which comprise hydrotreating, in the presence of a hydrotreating catalyst and at a temperature between 800° F. and 1050° F. a pressure between 350 p.s.i.g. and 2000 p.s.i.g., a molar ratio of hydrogen to oil between 5:1 and 20:1 and a liquid space velocity of between 0.5 and 10.0, a petroleum fraction boiling mainly within the range 400° F. to 550° F., and selected from the group consisting of cracked gas oil and mixed aromatic hydrocarbons separated from cracked gas oil, contacting the hydrotreated petroleum fraction with sodium metal in an ether solution to form sodium naphthalene compounds, carbonating the resulting reaction mixture with carbon dioxide to form sodium salts of said dicarboxylic acids, acidifying the sodium salts with a mineral acid, and esterifying the resulting acids with an alcohol having 1 to 8 carbon atoms.

5. As a new composition of matter, a mixture of acids prepared by hydrotreating in the presence of a hydrotreating catalyst a petroleum fraction boiling mainly within the range of 400° F. to 550° F. and selected from the group consisting of cracked gas-oil and mixed aromatic hydrocarbons separated from cracked gas-oil under conditions including a temperature between 800° F. and 1050° F., a pressure between 350 p.s.i.g. and 2000 p.s.i.g., a molar ratio of hydrogen to oil between 5:1 and 20:1, and a liquid space velocity of between 0.5 and 10.0; contacting the hydrotreated fraction with an alkali metal in an ether solution, followed by carbonation of the reaction mixture with carbon dioxide and acidification with a mineral acid.

6. As a new composition of matter, esters of an alcohol having 1 to 8 carbon atoms with a mixture of acids prepared by hydrotreating in the presence of a hydrotreating catalyst a petroleum fraction boiling mainly within the range of 400° F. to 550° F. and selected from the group consisting of cracked gas-oil and mixed aromatic hydrocarbons separated from cracked gas-oil under conditions including a temperature between 800° F. and 1050° F., a pressure between 350 p.s.i.g. and 2000 p.s.i.g., a molar ratio of hydrogen to oil between 5:1 and 20:1, and a liquid space velocity of between 0.5 and 10.0; contacting the hydrotreated fraction with an alkali metal in an ether solution, followed by carbonation of the reaction mixture with carbon dioxide and acidification with a mineral acid.

7. A new composition of matter comprising esters of n-amyl alcohol with a mixture of acids prepared by hydrotreating in the presence of a hydrotreating catalyst a mixed aromatic fraction separated from cracked gas-oil, said aromatic fraction boiling mainly in the range of 450° F. to 500° F. under conditions including a temperature between 800° F. and 1050° F., a pressure between 350 p.s.i.g. and 2000 p.s.i.g., a molar ratio of hydrogen to oil between 5:1 and 20:1, and a liquid space velocity of between 0.5 and 10.0; contacting the hydrotreated mixed aromatic fraction with sodium metal in a dimethoxy ethane solution, followed by carbonation of the reaction mixture with carbon dioxide and acidification with a mineral acid; said esters boiling mainly within and through the range from 170° C. to 225° C. at 0.5 mm. Hg.

8. In a process for the manufacture of substituted dihydronaphthalene dicarboxylic acid, the steps which comprise hydrotreating, in the presence of a hydrotreating catalyst and at a temperature between 800° F. and 1050° F. a pressure between 350 p.s.i.g. and 2000 p.s.i.g., a molar ratio of hydrogen to oil of between 5:1 and 20:1 and a liquid space velocity of between 0.5 and 10.0; a petroleum fraction boiling mainly within the range of 400° F. to 550° F. and selected from the group consisting of cracked gas oil and mixed aromatic hydrocarbons separated from cracked gas oil, contacting the hydrotreated petroleum fraction with alkali metal in an ether solution to form alkali naphthalene compounds, carbonating the resulting reaction mixture with carbon dioxide to form alkali salts of said dicarboxylic acids and acidifying with a mineral acid.

References Cited in the file of this patent
UNITED STATES PATENTS

| | | |
|---|---|---|
| 2,033,056 | Walker | Mar. 3, 1936 |
| 2,040,882 | Scott | May 19, 1936 |
| 2,135,062 | Walker | Nov. 1, 1938 |
| 2,826,561 | Gloskey | Mar. 11, 1958 |

OTHER REFERENCES

Trusty, Petroleum as a Source of the Aromatic Hydrocarbons; Petroleum Refiner, volume 22, No. 4, April, 1943, pages 95–99.

Groggins: Unit Processes in Organic Synthesis, McGraw-Hill Company, New York, 1952, 4th edition, pages 539–540.